United States Patent
Ross

(10) Patent No.: US 8,081,540 B2
(45) Date of Patent: Dec. 20, 2011

(54) ROTARY SUBWOOFER MARINE SEISMIC SOURCE

(75) Inventor: Allan A. Ross, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 222 days.

(21) Appl. No.: 12/486,890

(22) Filed: Jun. 18, 2009

(65) Prior Publication Data
US 2009/0316523 A1 Dec. 24, 2009

Related U.S. Application Data

(60) Provisional application No. 61/074,405, filed on Jun. 20, 2008.

(51) Int. Cl.
*G01V 1/02* (2006.01)
*G01V 1/145* (2006.01)
(52) U.S. Cl. .......... 367/142; 181/113; 181/114; 367/15
(58) Field of Classification Search .......... 367/142, 367/15; 181/113, 114, 115, 119, 120
See application file for complete search history.

(56) References Cited

U.S. PATENT DOCUMENTS

| | | | | |
|---|---|---|---|---|
| 2,395,862 A | * | 3/1946 | Freeman et al. | 367/1 |
| 3,022,852 A | | 2/1962 | Pavey, Jr. | |
| 3,430,727 A | * | 3/1969 | Thigpen et al. | 181/118 |
| 4,006,795 A | * | 2/1977 | Anstey | 181/121 |
| 4,897,056 A | * | 1/1990 | Muller | 440/50 |

FOREIGN PATENT DOCUMENTS

EP 553 053 B1 7/1993

OTHER PUBLICATIONS

Eminent Technology, "TRW-17 The Worlds First True Subwoofer", Apr. 3, 2008, Publisher: Internet website, Published in: US.
Search report from application No. GB 0910609.7, Oct. 2009.
Photograph of Kawasaki Side Thruster, Nov. 2007.

* cited by examiner

*Primary Examiner* — Ian Lobo
(74) *Attorney, Agent, or Firm* — Albert K. Shung

(57) ABSTRACT

According to a preferred aspect of the instant invention, there is provided herein a system and method for creating low frequency seismic waves. In brief, the instant invention uses a rotary propeller-type system that has been mounted in, for example, a barge or other marine vessel as a seismic source. In the preferred arrangement, the instant source will generate a seismic signal that has greater low frequency content (e.g., frequencies that are less than about 10 Hz) than has been possible heretofore.

11 Claims, 4 Drawing Sheets

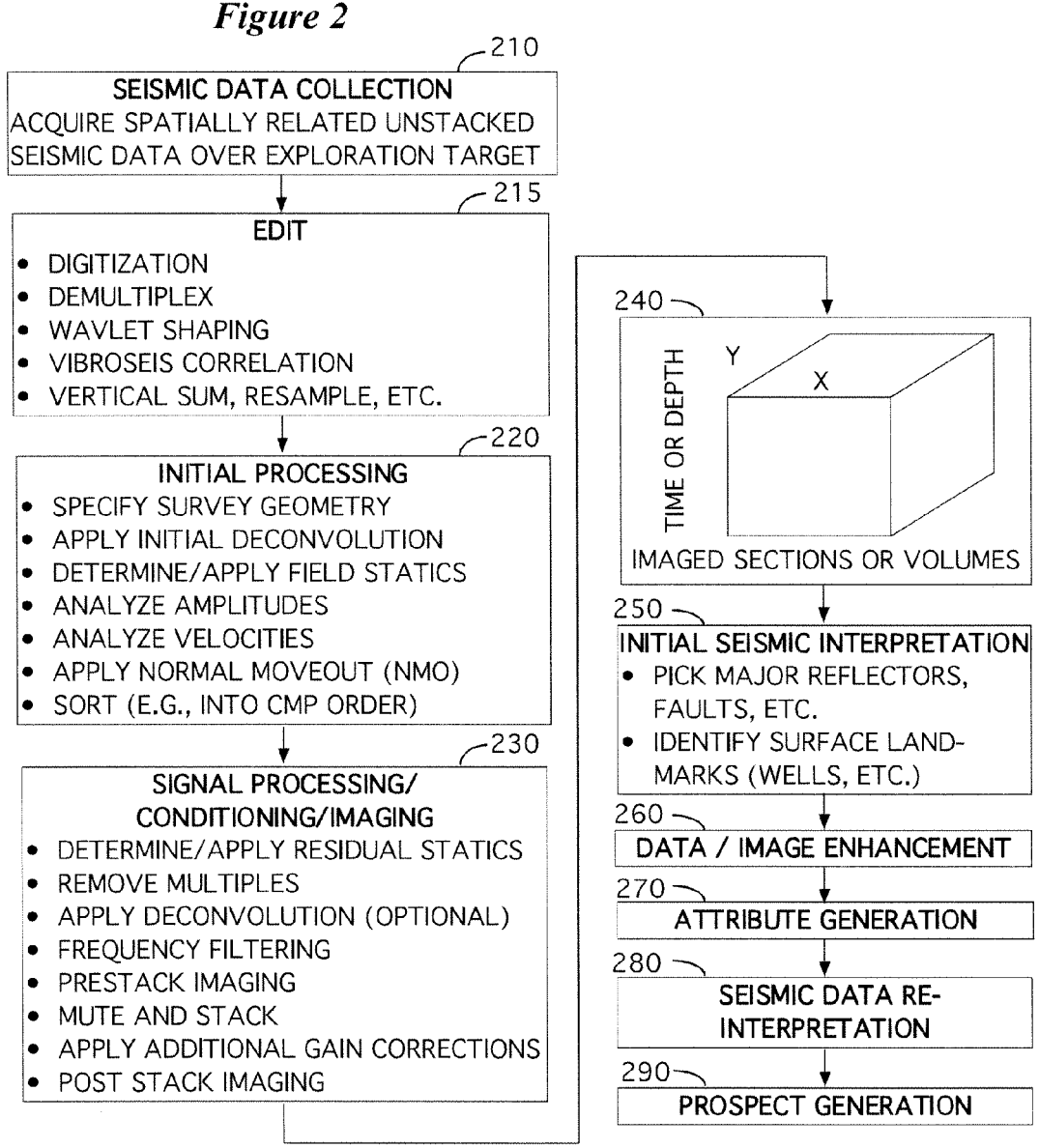

ROTARY SUBWOOFER MARINE SEISMIC SOURCE

RELATED CASE

This application claims the benefit of U.S. Provisional Patent Application Ser. No. 61/074,405 filed on Jun. 20, 2008, and incorporates said provisional application by reference into this disclosure as if fully set out at this point.

TECHNICAL FIELD

This invention relates to the general subject of seismic exploration and, in particular, to methods for generating seismic signals for use in interrogating the subsurface of the earth.

BACKGROUND OF THE INVENTION

A seismic survey represents an attempt to image or map the subsurface of the earth by sending sound energy into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth in proximity to an area of structural or stratigraphic interest. Each time the source is activated, it generates a seismic signal that travels through the earth, is reflected or refracted, and is recorded at a great many locations. Multiple source/recording combinations are then combined to create a near continuous profile of the subsurface that can extend for many kilometers. In a two-dimensional (2D) seismic survey, the recording locations are generally laid out along a single line, whereas in a three dimensional (3D) survey the recording locations are distributed across a surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others can often be empirically correlated with known hydrocarbon occurrences and that correlation applied to seismic data collected over new exploration targets.

One well-known problem with seismic data, though, is that it tends to be deficient in the lower frequencies (e.g., frequencies below about 10 Hz). It has long been recognized that the information contained within these lower frequencies can be invaluable and, to the extent that a seismic source can generate them, they provide a useful exploration resource. For example, low frequency seismic waves are known to penetrate more deeply and yield reflections off of subsurface interfaces at much greater depths than do higher frequency waves. Thus, the source power at lower frequencies can be especially important when the goal is to image deep exploration targets, such as subsalt and sub-basalt plays, and for deep crustal studies. Similarly, in some exploration areas local surface and/or subsurface geology can selectively attenuate, scatter, and/or disperse higher frequencies, thus making lower frequency sources preferred. Since low frequencies can play a key role in the inversion process (e.g., where estimates of acoustic impedance and other reservoir properties are obtained form seismic data), it is almost always desirable to increase the low frequency content of the seismic source. Unfortunately, surface seismic data usually lack low frequencies necessary for accurate inversion, so they are commonly augmented by data from well-log measurements as part of the inversion process. When well-log data are sparse or not available, inversion of seismic data is problematic.

However, creating a seismic source that is rich in low frequencies, where the low frequencies are of the requisite amplitude, is not a simple matter.

Heretofore, as is well known in the seismic acquisition, processing, and interpretation arts, there has been a need for a method of creating a low frequency seismic signal that can be used in exploration for subsurface hydrocarbons. Accordingly, it should now be recognized, as was recognized by the present inventor, that there exists, and has existed for some time, a very real need for a method of seismic data acquisition that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for creating low frequency seismic waves. In brief, the instant invention uses a rotary subwoofer that has been mounted in, for example, a barge or other vessel as a seismic source. The rotary seismic source of the instant invention will be comprised of a propeller, prop, or other bladed device ("propeller", hereinafter) that is situated within a water filled containment structure that is preferably integral to a boat, barge, or other vessel. The container that houses the propeller will be in fluid communication with the body of water in which the vessel floats. The pitch of the prop, among other parameters, will be used to vary the signal frequency that is generated by the seismic source. In the preferred arrangement, the instant source will generate lower frequency (e.g., less than about 10 Hz) seismic signals than has been possible heretofore.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 2 illustrates a seismic processing sequence suitable for use with the instant invention.

DETAILED DESCRIPTION

Figure 1:
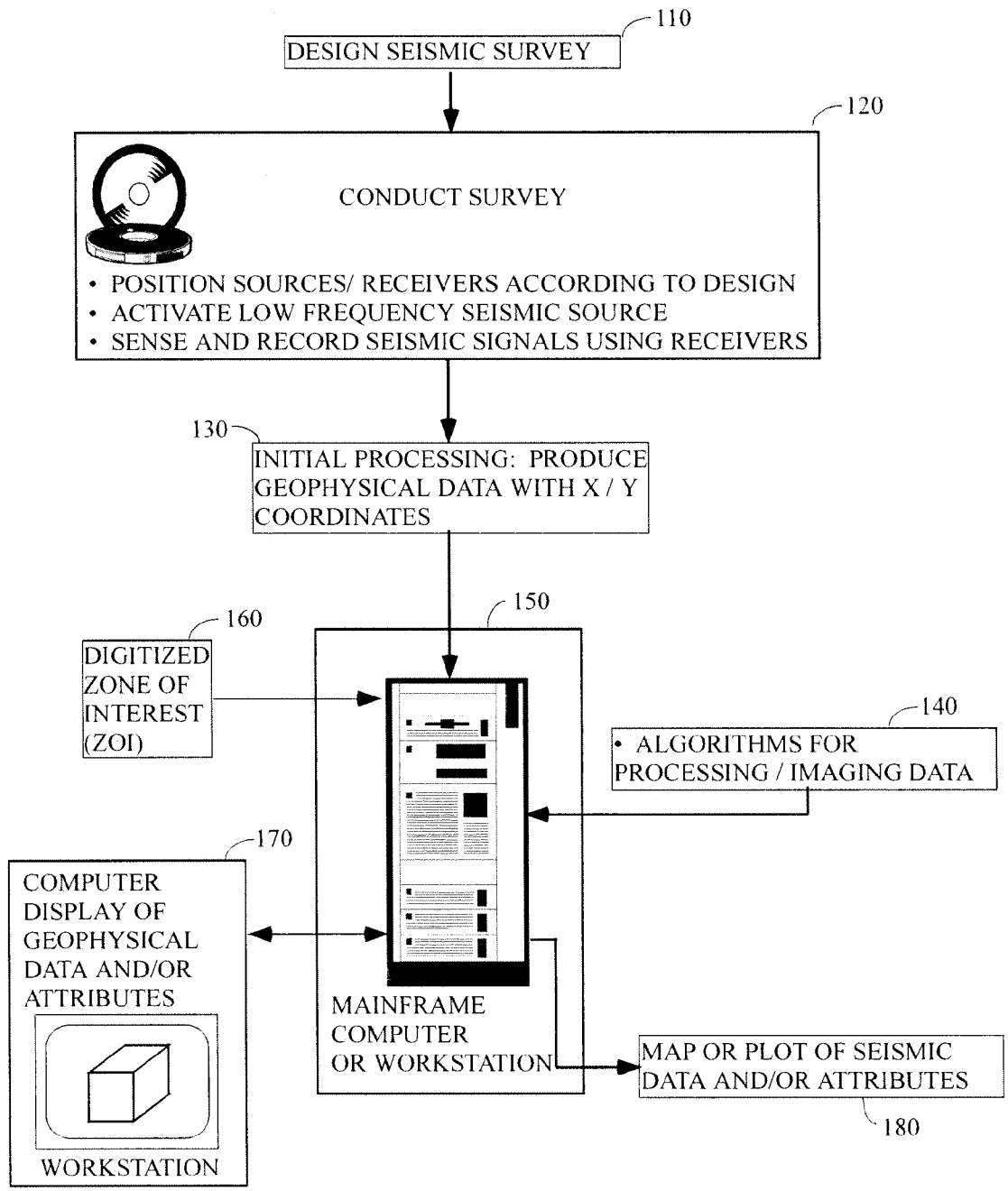
FIG. 1 illustrates the general environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey. Additionally, and depending on the target, the survey might be taken over water, on land, or some combination.

Seismic data are collected in the field 120 over a subsurface target of potential economic importance and are typically sent thereafter to a processing center 150 where they will be processed for use in exploration. In some cases, there may be some initial data processing performed in the field and this is becoming more common and feasible given the computing power that is available to field crews.

Figure 6:
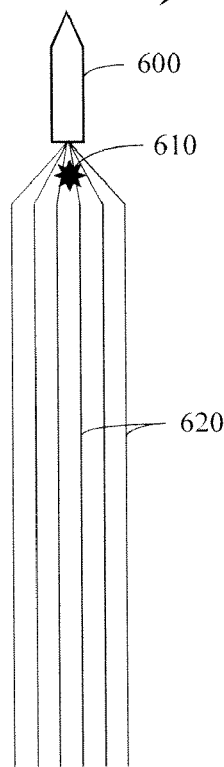
FIG. 6 illustrates a prior art marine survey configuration.

In the event that the subsurface target is covered by water, marine acquisition methods are used, where marine is used herein to indicate seismic data acquisition in either salt or fresh water environments. Traditionally, marine seismic data are acquired via a towed streamer survey. As is generally indicated in FIG. 6, in a conventional arrangement a vessel 600 tows several hydrophone cables 620 behind it (i.e., several "streamers" in the argot of the trade) as it steams over a subsurface area of interest. Each streamer will typically contain several hundred hydrophones (i.e., the marine equivalent of geophones) which are designed to sense seismic signals that have been reflected, refracted, diffracted, etc., from subsurface rock formations and other density contrasts. Of course, those of ordinary skill in the art will recognize that in some instances instead of towing the hydrophones behind a boat, they will be permanently or semi permanently placed on the water bottom, downhole within a well, etc. The marine source 610 will then be activated when the towing vessel 600 is in the vicinity of the water bottom array.

In a marine survey, at periodic intervals a seismic source 610 (which is typically also towed by that vessel 600 and located directly behind it) is activated. The source energy propagates downward through the water and penetrates into the ocean bottom, where it is ultimately encounters subsurface rock formations that reflect part of the down going energy back up toward the receivers. Recordings are made of the sensor responses for a short period of time after the source is activated (e.g. for 10 to 20 seconds) at a sample interval that is often either 2 ms or 4 ms.

In the processing center a variety of preparatory processes 130 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented during the time when the seismic data is acquired 120. After the data have been acquired, it will typically be brought to a centralized processing facility and loaded into a programmable computer 150 where it will be processed for use in exploration. Note that the computer 150 would typically include, in addition to mainframes, workstations, and servers, super computers and, more generally, individual computers or networks of computers (to include networks of individual processors or CPUs) that allow parallel and massively parallel computations, wherein the computational load is distributed between two or more processors. As is also illustrated in FIG. 1, in the preferred arrangement some sort of digitized zone of interest model 160 may be specified by the user and provided as input to the processing computer program. In the case of a 3D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 that would be useful in processing data that has been obtained via the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the various algorithms, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

As was indicated previously, data that has been collected according to the instant invention will preferably be processed via a seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2D or 3D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art.

A principal goal of a seismic survey is to obtain a collection of spatially related seismic traces that have been acquired over a subsurface target of some potential economic importance. Data that are generated and collected via the methods disclosed herein might be organized into, for purposes of illustration only, an unstacked 2-D seismic line, an unstacked 2-D seismic line extracted from a 3D seismic survey or, preferably, an unstacked 3D portion of a 3D seismic survey. The invention disclosed herein will likely be most utilized to acquire a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 edits the input seismic data in preparation for subsequent processing (e.g., demux, if it has not already been done in the field, gain recovery, wavelet shaping, bad trace removal, etc.). This might be followed by specification of the geometry of the survey (step 220) and storing a shot/receiver number and a surface location as part of each seismic trace header. Once the geometry has been specified, it is customary to perform a velocity analysis and apply an NMO (normal move out) correction to correct each trace in time to account for signal arrival time delays caused by offset. Of course, those of ordinary skill in the art will recognize that that the previous processing sequence might be modified if, for example, prestack migration is contemplated (e.g., NMO would not be required).

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

PREFERRED EMBODIMENTS

According to a first preferred embodiment of the instant invention, there is provided a method and apparatus for generating low frequency seismic signals for use in geophysical exploration of the subsurface of the earth. The instant apparatus will preferably be used off shore (e.g., in a salt or fresh water environment) to generate low frequency waves for use as a seismic source.

It should be noted that the instant invention is loosely based on the concept of the acoustic rotary subwoofer as it is used in high fidelity audio systems. In such systems, an electrical signal is used to vary the pitch (i.e., angle of the blade with respect to the direction of rotation) of the blades in a spinning fan, thus modulating the airflow to yield the desired audio signal.

Figure 3A:
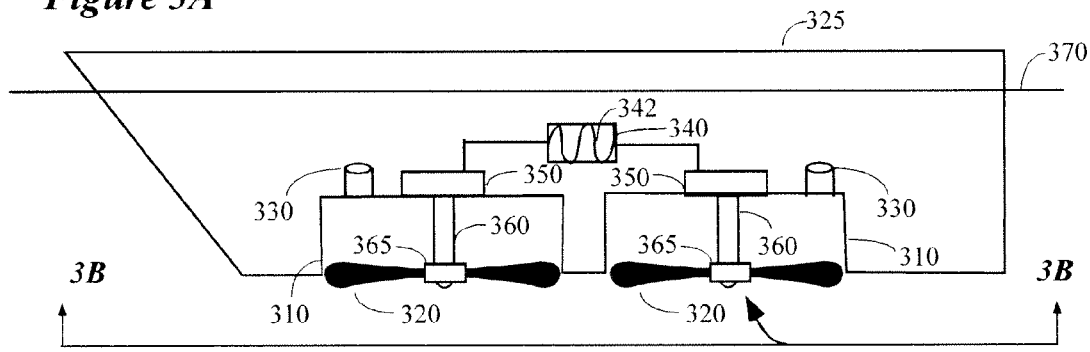
FIGS. 3A and 3B contain a general illustration of a preferred embodiment of the instant invention as it might appear when installed in a barge or other towed ship.
Figure 3B:
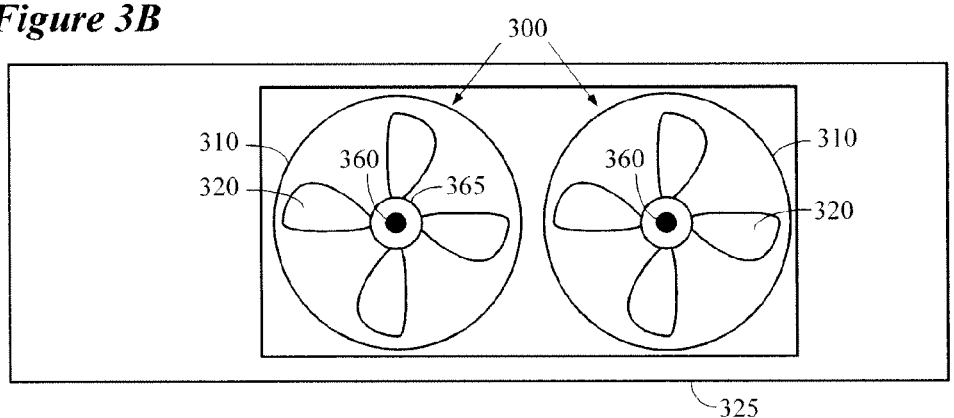

However, the instant invention is designed to work instead in a liquid environment. As is generally indicated in FIGS. 3A and 3B, according to a preferred embodiment there is provided an apparatus 300 for generating low frequency seismic signals which utilize one or more propeller blades 320 (or props, blades, fan blades, etc.) that are submerged in the water as is generally indicated in this figure. Note that the terms "prop" and "propeller" should not be interpreted as any sort of requirement that the instant invention 300 be capable of propelling the vessel 325 through the water 370, although, depending its orientation, that could certainly be one of its functions—either primary or secondary.

In a preferred embodiment, a barge 325 or other vessel will be modified by adding one or more bulk containment structures (liquid tanks 310) inside the barge 325 and in fluid communication with the body of water in which the vessel 325 floats. Preferably, each tanks 310 will be situated so that its downward facing mouth is beneath the surface of the water and the tank 310 itself will be substantially filled with water. Within each tank 310 will preferably be positioned a propeller that is comprised of a shaft 360, two or more blades 320 that are mounted on the shaft 360, a motor/control box 350 that controls rotation of the shaft 360/blades 320 combination, and a motor 365 that adjusts the pitch of the blades. Note that although the instant specification and claims might refer to the propellers as being "within" the tank 310, that language should be broadly construed to include instances where all or part of the propeller extends downward beyond the lower extent of the tank 310 (e.g., the arrangement of FIG. 3A) but it is close enough to the tank 310 mouth to be able to interact with it.

Additionally, and as is discussed in greater hereinafter, preferably the control box 350 will also control the pitch of each of the blades 320 via motor 365, but certainly other arrangements are possible and are well within the ability of one of ordinary skill in the art. Further, it should be noted and remembered that of the blades 320 may be oriented at a different pitch if that would be beneficial, i.e., there is no requirement that each blade 320 be set to the same pitch angle. Additionally, although the preferred embodiment utilizes two or more adjustable-pitch blades 320, obviously a single blade 320 could be used if either a matching non-adjustable (conventional) blade were provided or if a counterweight of some sort were used. Further, it should be noted that if the blades 320 are made to be variable in pitch in real-time (as opposed to fixed in pitch during operation, but adjustable thereafter), a separate motor or motors (not shown) could be used to adjust the blade pitch, preferably while the blade(s) 320 are rotating. That being said, it is certainly possible that motor that rotates the blades 320 might also provide the motive force to adjust the blade pitch. Those of ordinary skill in the art will be readily able devise mechanisms for doing this. Thus, when the term "motor" is used in conjunction with adjustment of the pitch of the blades 320, that term should be broadly construed to cover instances where a single motor provides the force for rotation and pitch adjustment, instances where separate motors are provided for pitch adjustment and rotation, and instances where a separate rotation motor is used with two or more motors that adjust the pitch of the blades (e.g., where each blade has its own motor).

Each tank 320 will preferably be supplied with a water from a water line 330 that in typical operation draws water from the body of water 370 in which the vessel 325 floats, draws it from an internal reservoir on the barge, or draws it from some other source. In the preferred arrangement, each of the blades 320 will be inclined in such a way that water will be drawn out of the tank 310 in which it is mounted and forced outward (i.e., downward in the case illustrated in FIG. 3) into the surrounding body of water. One advantage of this arrangement is that the bulk tanks 320 create, in effect, an infinite baffle. As was indicated previously, each tank 310 will preferably be resuppplied with water via a water line 330, which might or might not be pressurized. Of course, if the pitch angle is adjusted to be negative, the water line 330 could be used to expel water from the tank 320. That being said, for purposes of specificity it will be assumed that the line 330 is an intake line that supplies water to the tank 320.

In the preferred arrangement a signal generator 340 will act as a controller to provide a control signal (e.g., example signal 342) that will specify the time-varying pitch of the blades 320 to create the desired seismic signal (e.g., swept frequency sinusoid, maximum length sequences, random sequences, etc.). Of course, the signal generator 340 might be a general purpose computer that has been programmed to generate the requisite signal, or it could be special purpose hardware developed for this particular purpose. Note that by "pitch" is meant the angle of each blade with respect to the plane of rotation (e.g., the angle theta in FIG. 5). Note additionally that it is possible that the pitch of the blades might be fixed throughout a source excitation (i.e., a single pitch is used for or variable during it according to the desires of the user.

Figure 4:
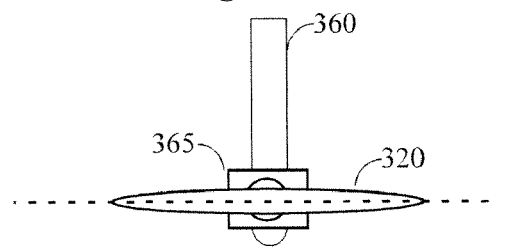
FIG. 4 illustrates a preferred embodiment of the instant invention as it might appear when the pitch of the blades is approximately equal to 0°.
Figure 5:
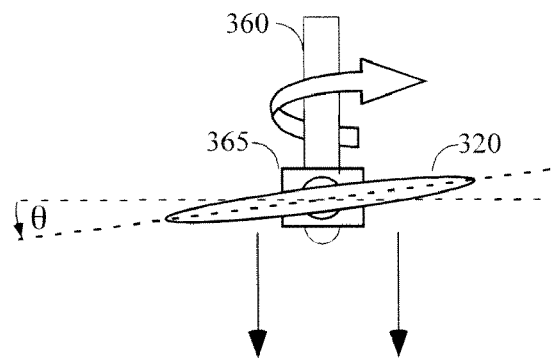
FIG. 5 contains an illustration of a preferred embodiment of the instant invention as it might appear when the pitch of each blade is at an angle of theta degrees with respect to the horizontal.

As is generally indicated in FIGS. 4 and 5, which are detailed views of the blade 320 and shaft 360 combination, in FIG. 4 the blade 320 has been drawn to have zero degrees of pitch, whereas in FIG. 5 the blades 320 have some positive amount of pitch as measured by the angle theta. A non-zero pitch will result in water flowing in a downward direction in this figure if the shaft 360 is rotated in the direction indicated. In the preferred embodiment, the motor/controller 350 would be configured to respond to the signal generator and alter the pitch of the blades 320 accordingly. Note that the geometry of blade 320 has been simplified to make clearer how pitch angle is defined. Those of ordinary skill in the art will recognize that a variety of complex 3D shapes can be used to construct prop surfaces and the various parameters that control the design of such are well known.

In some preferred arrangements, a transfer function that relates blade pitch and/or rotational speed to output frequency will be used by the signal generator 340 to translate the desired seismic signal into a preferably time-varying control signal. This transfer function might be determined empirically by, for example, stepping the blades 320 through a series of increasingly larger pitch angles and recording the frequency characteristics (e.g., center frequency) of the waves generated thereby. A simple plot of recorded center (or other) frequency versus pitch could readily be used to form a crude estimate of a transfer function according to methods well known to those of ordinary skill in the art. In some cases, numerical models could be used to predict the frequency/pitch relationship and, if so, that would be a more convenient method than doing field studies. Those of ordinary skill in the art will recognize the advantages and disadvantages of each approach.

More generally, a constant-speed or variable-speed fan or propeller (such as, but not limited to, a ducted fan configuration, a Kort nozzle, a marine vessel thruster, etc.) will preferably be used to modulate the flow of water, thereby producing sound waves in the water. The pitch or "blade angle" will be defined to be the angle between the chord of the propeller blade and the plane in which the blades rotate. When the blade angle is "low", the blade angle is near zero and the water flow is low. When the blade angle is "high", i.e., near 90°, the blades are rotated with the chord approximately inline to the shaft. When the blade angle is 90°, the blades will be said to be "feathered" and the water flow will also very low.

In some preferred embodiments, a frequency sweep will be used (e.g., analogous to a land vibrator sweep) to create a complex signal pattern. Every frequency within the sweep will have an optimum blade angle at which the water flow is maximized. That blade angle will preferably be calculated from hydrodynamic principles, and then experimentally verified.

Figure 8:
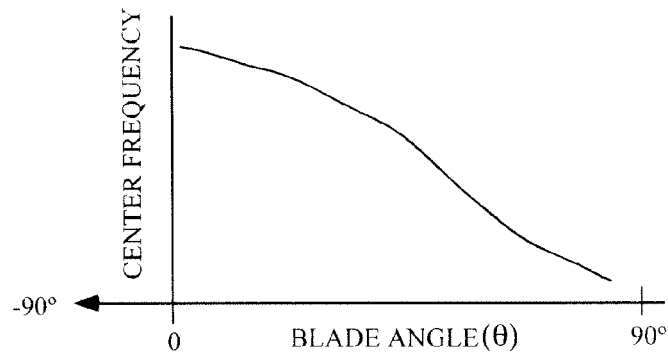
FIG. 8 contains a schematic illustration an empirically derived transfer function that relates blade angle and center frequency for a constant rotation speed.

Generally speaking, a high blade angle will tend to produce more low frequencies and a low blade angle will tend to produce higher frequencies. See, for example, the stylized example of an empirical transfer function in FIG. 8. Note that this example illustrates in a general how this function might appear for prop that rotates at a constant a constant rotational frequency.

In some preferred embodiments, the blade angle will be varied cyclically over time with a period equal to the period of the desired acoustic signal. The mean value of the blade angle during one cycle, and its profile during one cycle, must be determined beforehand in order to achieve the frequency content and amplitude that is desired in the radiated signal. These parameters will preferably be determined by numerical modeling of the propeller's dynamic interaction with the water, or by empirically by experimentation. In a preferred arrangement, at each frequency the pre-selected optimum blade angle will be reached and then the blade angle will be varied slightly on both sides (plus and minus) of the optimum angle. This toggling of the angle will vary the instantaneous hydrodynamic pressure that comprises the water-borne wave. To generate the next frequency in the sequence, the pre-selected optimum blade angle will preferably be determined and the toggling process repeated.

If a propeller is employed that can only achieve a positive blade angle, the blade angle will cycle either side of a positive value to prevent the propeller from passing through zero blade angle and stalling, thereby creating turbulent flow and seismic noise.

A custom-designed propeller could employ blades with a symmetric (or asymmetric as needed) cross section and a mean blade angle of zero at all frequencies. The amplitude and profile of toggling would vary with frequency. Of course, there is an extensive literature in connection with propeller shape and those of ordinary skill in the art will recognize that many different cross sectional/airfoil configurations might possibly be used.

If the pressure output is determined to be a nonlinear function of the rate of change of blade angle, the toggling amplitude might be chosen to be a non-sinusoidal function of time. A variable RPM could provide an extra degree of freedom to control the flow modulation. The flow modulation varies inversely with frequency so at low frequencies the modulation will be large. To produce a flat signal power spectrum, one could either toggle through larger angles or run at a higher RPM, if not both.

Figure 7:
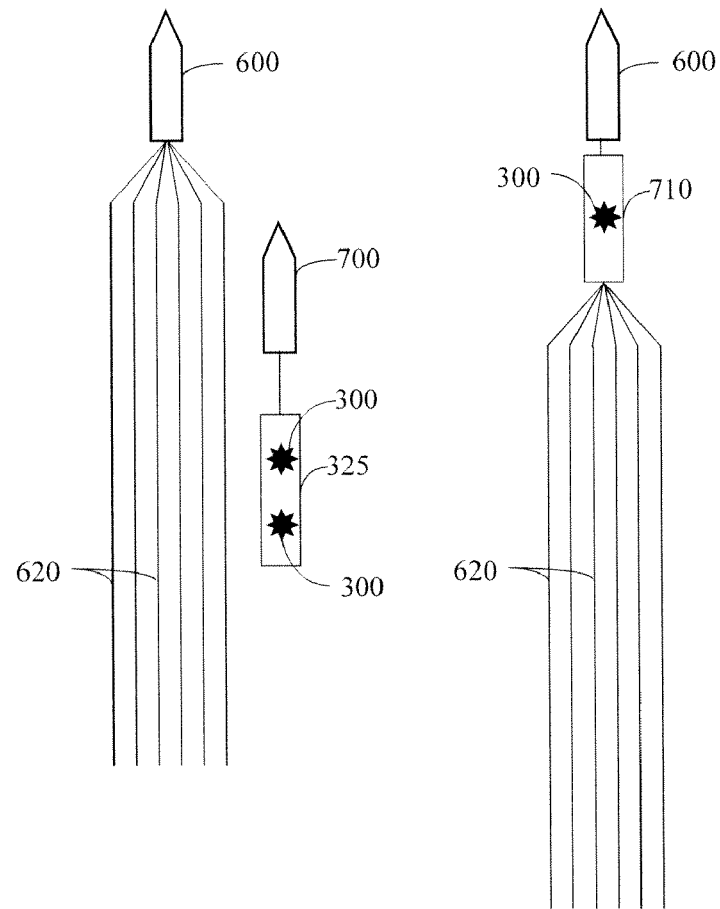
FIG. 7 illustrates two preferred source configurations suitable for use with the instant invention.

In practice, the barge 325 that contains the instant invention 300 will steam (or be towed by vessel 700) over the survey area. See, for example, the arrangement illustrated in FIG. 7. The barge 325 might be ahead of (e.g., the in-line configuration of barge 710), parallel with, or behind the streamers 620 and might have one, two or more rotary seismic sources 300. It might also be inline with or offset from the streamers as determined by the explorationist who will design the survey. During the times that the instant invention 300 is operational, seismic data will be recorded by any sort of conventional or unconventional recording device (e.g., seafloor cable, sea floor nodes, streamers, etc.). The input signal to the instant rotary seismic source 300 as provided by signal generator 340 could be used to correlate or invert the recorded seismic data to collapse the waveform, but is not a requirement.

CONCLUSIONS

Although FIG. 3 suggests that a barge 325 or other vessel might be equipped with two source devices 300 and the discussion herein has been largely framed in terms of that arrangement, those of ordinary skill in the art will recognize that a single source device 300 or several source devices 300 might be placed within a single vessel. In some instances, multiple barges 325 might be used, e.g., one ahead of the streamer and one behind it.

Further, it should be noted that in some variations the two or more low frequency source devices 300 might be responding to exactly the same generating (e.g., sweep or pilot) signal, thereby increasing the signal strength accordingly. In other instances, the two or more source devices 300 might be responding to different source signals that reinforce or selectively interfere with each other as the situation requires.

Additionally, in some instances one or more hydrophones or other receivers might be situated in the water or on the vessel proximate to the sources 300. Such receivers might be useful in measuring the near field source signature(s) for purposes of direct analysis (quality control, etc.), subsequent analysis (e.g., an operation that is analogous to the marine debubble method), or feedback control while the source is operating.

Still further, it should be noted that there are a number of parameters that might be adjusted to obtain a desired signal frequency, amplitude, etc. For example and in addition to rotational speed and pitch discussed previously, the following provide examples of the sorts of parameters that might be considered in constructing a signal source according to the instant invention: the number of propellers; the number of blades; the ratio of the diameter of the containment structure to the length of blades; the distance from the center of the blades to the bottom of the containment structure (which might be above, below, or parallel to it); the cross sectional shape of the containment structure (circular, elliptical, polygonal, etc.); the height of the containment structure relative to its diameter; the shape of the blades, their tip geometry, and their cross sectional shape, etc.

Finally, although the instant invention is well suited to generate low frequency seismic signals, those of ordinary skill in the art will recognize that it will necessarily generate at least some higher frequency signals as well. In some preferred arrangements, it is anticipated that the instant invention could be configured to generate a greater mix of higher frequency signals, thereby making it potentially useful in contexts that would benefit from a source signal that has a broader bandwidth.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A low frequency seismic source for use on a marine vessel, comprising:
    a) a water filled containment structure affixed to said marine vessel, said containment structure having a lower terminus with a mouth therein, said mouth being positionable to be within a body of water in which said marine vessel floats;
    (b) a rotatable propeller carried by said containment structure having at least one blade that is adjustable with respect to pitch angle;
    (c) a first motor operatively connected to said at least one blade, for adjusting said pitch angle in response to a control signal;
    (d) a second motor, operatively connected to said propeller, for rotating said propeller in said body of water; and
    (e) a controller in communication with said first motor for generating said control signal.

2. The low frequency seismic source according to claim 1, wherein said containment structure is situated interior to said vessel.

3. The low frequency seismic source according to claim 1, wherein said propeller has four blades.

4. The low frequency seismic source according to claim 1, wherein said marine vessel has a plurality of low frequency seismic sources affixed thereto.

5. The low frequency seismic source according to claim 1, wherein said propeller has a plurality of blades and wherein each of said plurality of blades may be positioned at a different pitch angle.

6. The low frequency seismic source according to claim 1, further comprising:
    (f) at least one hydrophone streamer positionable to be proximate said containment structure; and,
    (g) at least one computer in electronic communication with said at least one hydrophone streamer, said at least one computer being programmed with a plurality of computer instructions for at least receiving signals generated by said propeller through said at least one hydrophone streamer.

7. The low frequency seismic source according to claim 1, wherein the marine vessel is a towed barge.

8. The low frequency seismic source according to claim 1, wherein said at least one propeller is situated within said containment structure opening.

9. The low frequency seismic source according to claim 1, further comprising:
    (f) a water line in fluid communication with said containment structure and with the body of water in which said marine vessel floats.

10. A low frequency seismic survey, said seismic survey imaging a predetermined portion of the subsurface of the earth containing structural and stratigraphic features conducive to the presence, migration, or accumulation of hydrocarbons, said seismic survey being obtained by recording repeated activations of a low frequency seismic source comprising:
    (a) a marine vessel;
    (b) a water filled containment structure affixed to said marine vessel, said containment structure having a lower terminus with a mouth therein, said mouth being situated within a body of water in which said marine vessel floats;
    (c) a rotatable propeller situated within said containment structure and in fluid communication with said body of water, said propeller having at least one blade; each of said at least one blade being adjustable with respect to a pitch angle;
    (d) a first motor in mechanical communication with said propeller, said first motor being responsive to a control signal to change said pitch angle of said at least one blade;
    (e) a second motor in mechanical communication with said propeller, said second motor rotating said propeller at a predetermined rate; and,
    (f) a control box in electrical communication with said propeller, said control box at least for generating said control signal, said control signal at least containing information regarding a blade pitch for each of said at least two blades.

11. A low frequency seismic source, comprising:
    (a) a marine vessel;
    (b) a water filled containment structure affixed to said marine vessel, said containment structure having a lower terminus with a mouth therein, said mouth being positionable to be within a body of water in which said marine vessel floats;
    (c) a rotatable propeller carried by said containment structure having at least one blade that is adjustable with respect to pitch angle;
    (d) a first motor operatively connected to said at least one blade, for adjusting said pitch angle in response to a control signal;
    (e) a second motor, operatively connected to said propeller, for rotating said propeller in said body of water; and
    (f) a controller in communication with said first motor for generating said control signal.

* * * * *